United States Patent
Lee et al.

(10) Patent No.: US 10,551,904 B2
(45) Date of Patent: Feb. 4, 2020

(54) MOBILE TERMINAL HAVING GRAPHIC MEMORY WITH MULTIPLE MEMORY AREAS FOR OUTPUTTING A PLURALITY OF IMAGE DATA AND METHOD OF CONTROLLING THE SAME

(71) Applicant: LG ELECTRONICS INC., Seoul (KR)

(72) Inventors: Jeongwoo Lee, Seoul (KR); Daewoo Kawk, Seoul (KR); Gunseek Oh, Seoul (KR); Seongcheol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 15/904,259

(22) Filed: Feb. 23, 2018

(65) Prior Publication Data

US 2018/0348846 A1  Dec. 6, 2018

(30) Foreign Application Priority Data

Jun. 1, 2017 (KR) .......................... 10-2017-0068617

(51) Int. Cl.
*G06F 1/3234* (2019.01)
*G09G 1/00* (2006.01)
(Continued)

(52) U.S. Cl.
CPC ........... *G06F 1/3265* (2013.01); *G09G 1/005* (2013.01); *G09G 3/3648* (2013.01);
(Continued)

(58) Field of Classification Search
CPC ...................................................... G06F 1/3265
(Continued)

(56) References Cited

U.S. PATENT DOCUMENTS

2017/0308226 A1* 10/2017 Yoo ...................... G06F 3/03545
2018/0061308 A1*  3/2018 Bae ......................... G09G 5/006
(Continued)

FOREIGN PATENT DOCUMENTS

KR  1020150116490   10/2015

OTHER PUBLICATIONS

Korean Intellectual Property Office Application No. 10-2017-0068617, Office Action dated Apr. 12, 2018, 4 pages.

*Primary Examiner* — Long D Pham
(74) *Attorney, Agent, or Firm* — Lee, Hong, Degerman, Kang & Waimey

(57) ABSTRACT

Provided is a mobile terminal including a graphic memory that includes multiple graphic memory areas in which different pieces of image data are stored, and that provides pieces of first image data that are stored in one or several graphic memory areas that are selected according to a control command; a display unit that is switchable between an activated state and an inactivated state, and to which an image that corresponds to the first image data is output, in the inactivated state; a controller that generates the control command, based on the size of the image, and that controls the display unit in such a manner that the image which corresponds to the first image data is output; and a power source unit that applies a power to a graphic memory area that is selected from among the multiple graphic memory areas, according to the control channel.

14 Claims, 17 Drawing Sheets

(51) Int. Cl.
*G09G 3/36* (2006.01)
*G06F 1/16* (2006.01)

(52) U.S. Cl.
CPC ... *G06F 1/1626* (2013.01); *G09G 2310/0232* (2013.01); *G09G 2310/04* (2013.01); *G09G 2330/027* (2013.01); *H04M 2250/22* (2013.01)

(58) Field of Classification Search
USPC .................................................. 345/173, 212
See application file for complete search history.

(56) References Cited

U.S. PATENT DOCUMENTS

2018/0203500 A1\* 7/2018 Kim ...................... G06F 1/3287
2018/0204303 A1\* 7/2018 Bae .......................... G09G 3/20

\* cited by examiner

MOBILE TERMINAL HAVING GRAPHIC MEMORY WITH MULTIPLE MEMORY AREAS FOR OUTPUTTING A PLURALITY OF IMAGE DATA AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2017-0068617, filed on Jun. 1, 2017, the contents of which are incorporated by reference herein in its entirety.

BACKGROUND OF THE DISCLOSURE

1. Field of the Disclosure

The present invention relates to a mobile terminal that is equipped with a display unit on which an image is displayed, and a method of operating the mobile terminal.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

An always-on-display (AOD) function of continuously outputting designated information even in an inactivated state can be applied to a display unit of a mobile terminal. In this case, although the mobile terminal operates in a low-power mode, electric current consumption continues to increase, and a problem can occur in that luminance decreases due to the continuous outputting of the designated information.

SUMMARY OF THE DISCLOSURE

Therefore, an aspect of the detailed description is to provide a mobile terminal that is capable of minimizing electric current consumption when designated information is output in a state where an always-on-display (AOD) function is performed, and a method of controlling the mobile terminal.

In addition, another aspect of the detailed description is to provide a mobile terminal that is capable of solving the problem that luminance decreases when designated information is output in a state where an always-on-display (AOD) function is performed, without changing an output position of an image, and a method of controlling the mobile terminal.

To achieve these and other advantages and in accordance with the purpose of this specification, as embodied and broadly described herein, there is provided a mobile terminal including: a graphic memory that includes multiple graphic memory areas in which different pieces of image data are stored such that each piece of the image data is stored in a respectively corresponding one of the multiple graphic memory areas, wherein the graphic memory is configured to provide pieces of first image data that are stored in one or several graphic memory areas that are selected from among the multiple graphic memory areas according to a control command; a display that is switchable between an activated state and an inactivated state and configured to display an image corresponding to the first image data using multiple pixels in the inactivated state; a controller configured to: generate the control command for selectively driving the one or several graphic memory areas based on a size of the image that is to be displayed in the inactivated state; and cause the display to display the image corresponding to the first image data; and a power source unit configured to apply power to the selected one or several graphic memory areas.

According to the embodiment, in the mobile terminal, wherein address data associated with an output position on the display is included in the first image data.

According to the embodiment, in the mobile terminal, wherein a position of a graphic memory area that corresponds to the first image data and the output position on the display, which corresponds to the first image data, have different pieces of address data.

According to the embodiment, in the mobile terminal, wherein the controller is further configured to: check whether an available space is present in a graphic memory area that corresponds to the first image data when an event occurs in at least one application in the inactivated state; and provide information associated with the event using the same graphic memory area based on the available space.

According to the embodiment, wherein: the controller is further configured to cause the display to display a different image by changing a number of graphic memory areas that are selected; and the different image results from outputting the first image data corresponding to a first graphic memory area and second image data corresponding to a second graphic memory area sequentially or concurrently.

According to the embodiment, in the mobile terminal, wherein the one or several graphic memory areas that are selected vary according to a type of the image that is to be displayed in the inactivated state.

According to the embodiment, in the mobile terminal, wherein the controller is further configured to: apply power to the selected one or more graphic memory areas to read the first image data; and maintain other non-selected memory areas in a power-off state while the first image data is read.

According to the embodiment, in the mobile terminal, wherein: pieces of image data that are stored in a respectively corresponding one of the multiple graphic memory areas correspond to pieces of partial data that constitute a first moving image; and the controller is further configured to cause the display to display the first moving image by selectively driving different pieces of image data, which are stored in the respectively corresponding multiple graphic memory areas, according to a designated order.

According to the embodiment, the mobile terminal may further includes a processor configured to: generate at least one or several pieces of image data among the different pieces of image data in the activated state; provide the generated one or several pieces of image data to a matching graphic memory area among the multiple graphic memory areas in the activated state; and operate in a sleep mode in the inactivated state.

According to the embodiment, in the mobile terminal, wherein the controller is further configured to: perform masking processing on one or several pixels among the multiple pixels; and detect a residual image area and change a pattern of masking periodically when the image corresponding to the first image data is updated.

According to the embodiment, in the mobile terminal, wherein a position of the pattern of the masking is changed within a range in which an output position of the first image data is continuously maintained.

According to the embodiment, in the mobile terminal, wherein at least one of transparency or brightness of the image that is input is automatically adjusted while the masking processing is performed on the one or several pixels among the multiple pixels.

According to the embodiment, in the mobile terminal, wherein the controller is further configured to: cause the display to display an indicator for adjusting the brightness of the displayed image in response to a proximity touch being maintained for a predetermined time in the activated state; and change the brightness of the displayed image based on a drag touch input applied to the indicator.

In addition, to achieve these and other advantages and in accordance with the purpose of this specification, as embodied and broadly described, there is provided a method of controlling a mobile terminal that includes multiple graphic memory areas in one graphic memory, the method including: storing different pieces of image data in the multiple graphic memory areas such that each piece of the image data is stored in a respectively corresponding one of the multiple graphic memory areas; selectively driving one or several graphic memory areas among the multiple graphic memory areas based on a size of an image that is to be displayed in an activated state when a display of the mobile terminal is switched from an activated state to the inactivated state; blocking power to graphic memory areas other than the one or several graphic memory areas among the multiple graphic memory areas such that power is applied to the one or several graphic memory areas selected from among the multiple graphic memory areas; and displaying the image corresponding to pieces of the image data that are stored in the selected one or several graphic memory areas.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1A:
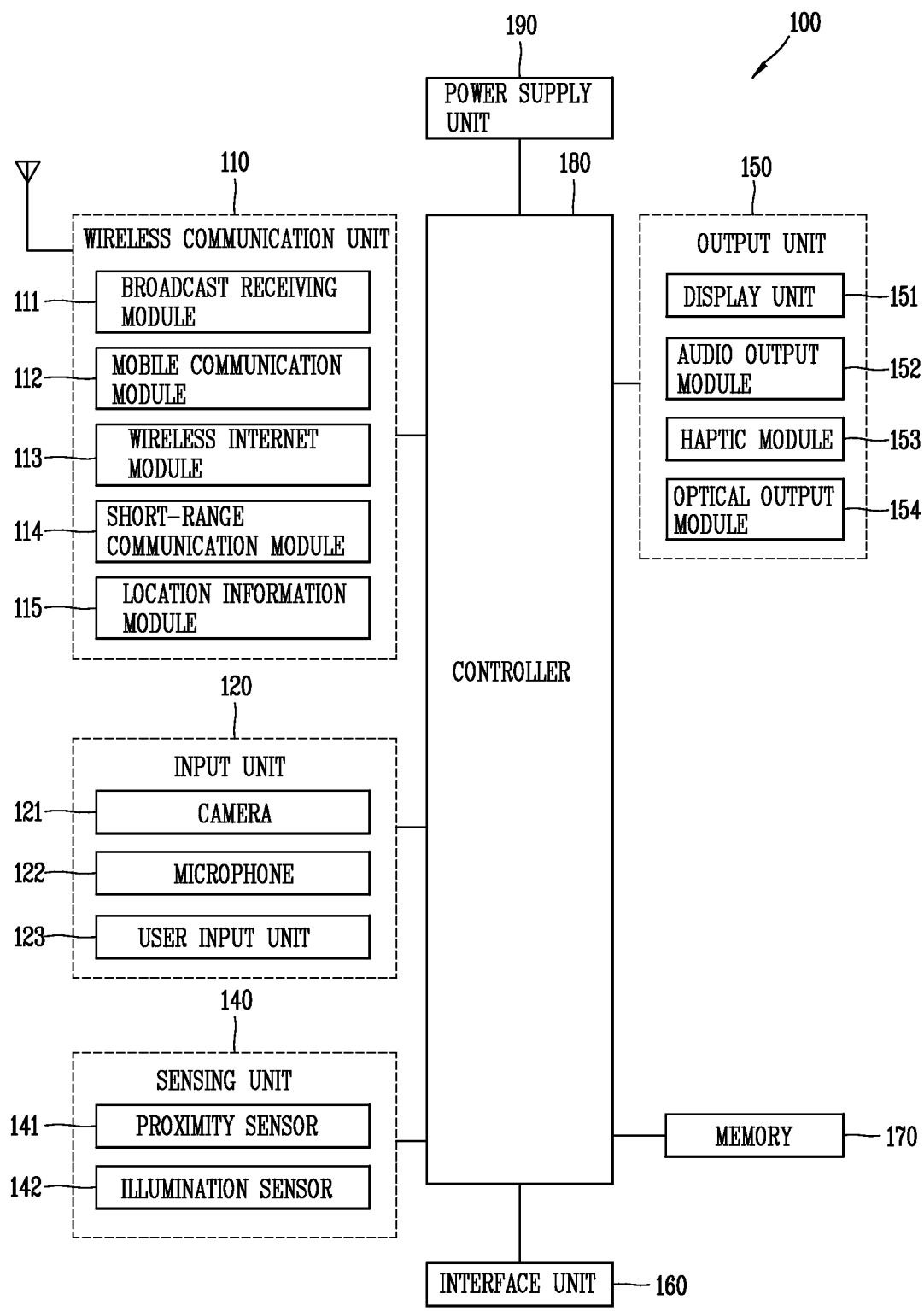
FIG. 1A is a block diagram for describing a configuration of a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
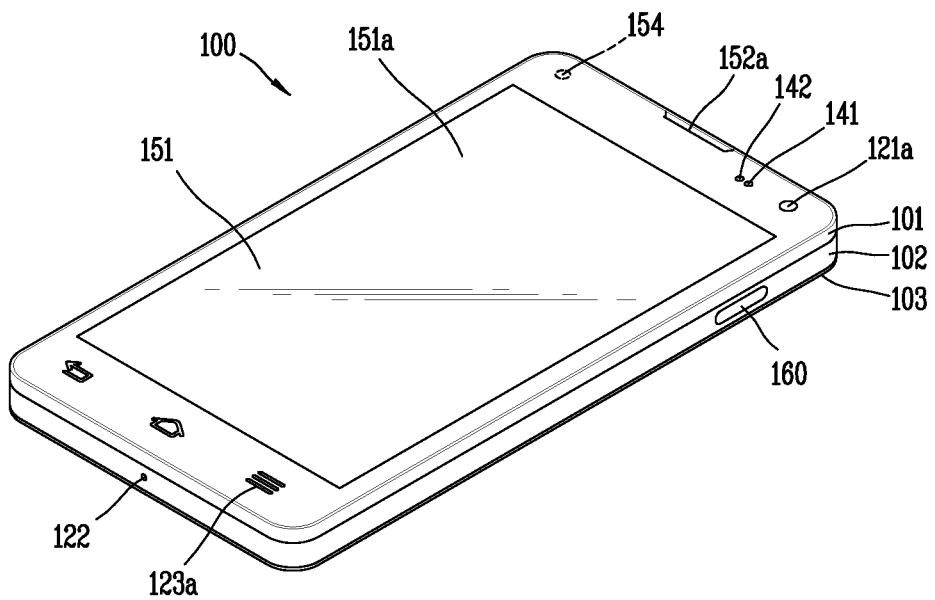
FIGS. 1B and 1C are conceptual diagrams, each illustrating the mobile terminal according to the present invention, when viewed from different directions.
Figure 1C:
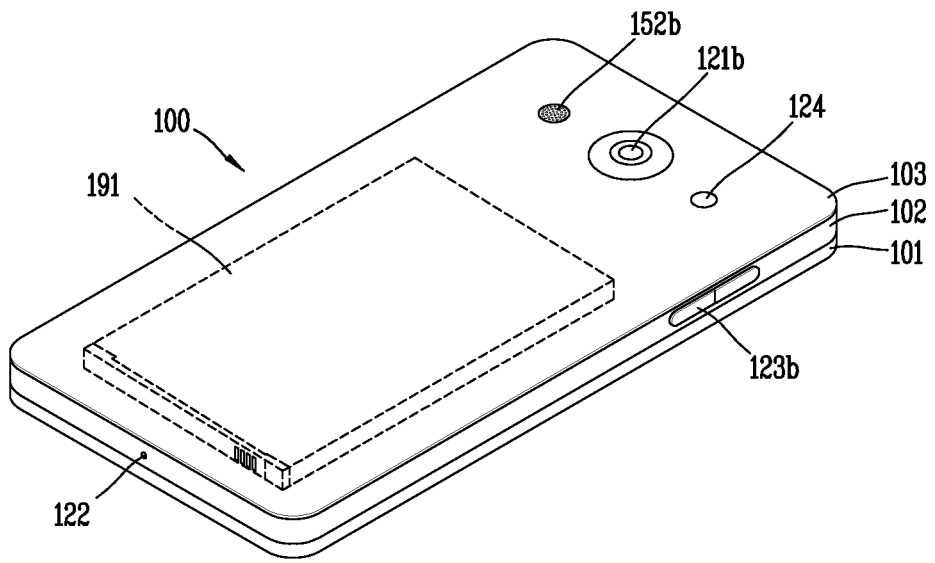

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 10:
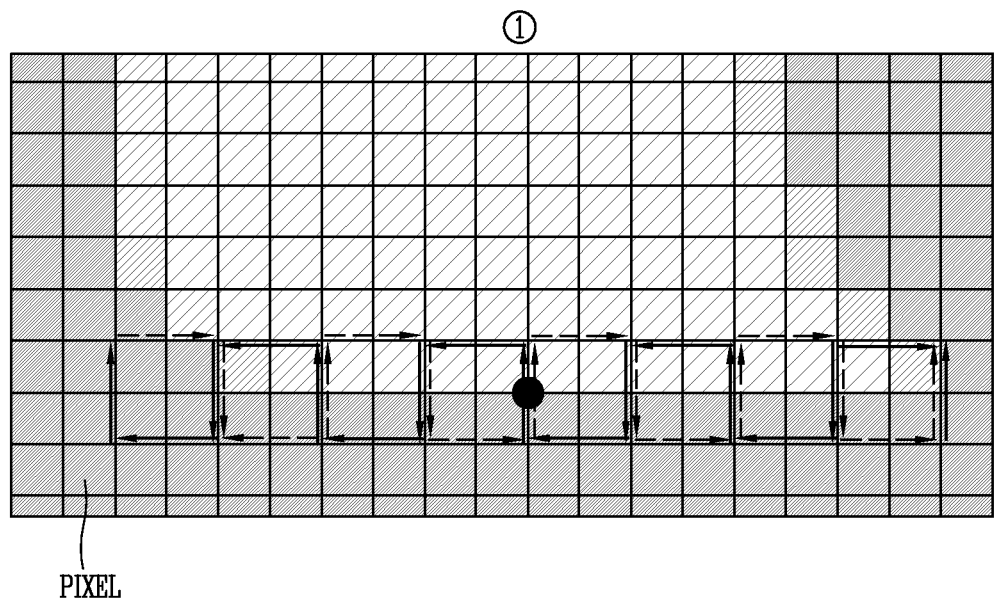

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In addition, it is possible that the display unit 151 of the mobile terminal 100 according to an embodiment of the present invention switches from one of the activated state and the inactivated state to the other. When the display unit 151 switches from the activated state to the inactivated state, information designated, for example, such as time information, an icon for an application designated, weather information, and date information can be output in the form of an image. In other words, in the mobile terminal 100 according to the present invention, a function (always-on-display (AOD)) of always displaying specific information even in a state where a screen of the display unit 151 is turned off can be activated. This can be realized by using a low-power mode in organic light-emitting diode display or embedding electronic ink in the rear surface of the mobile terminal 100. A specific description associated with this is omitted.

Figure 2:
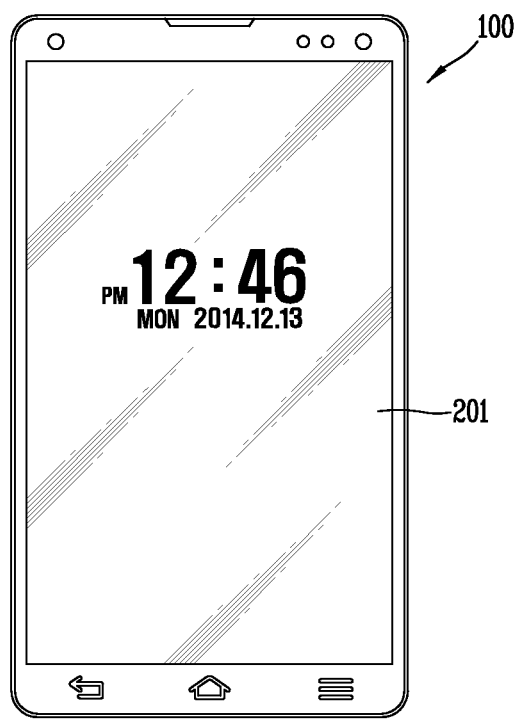
FIG. 2 is an exemplary conceptual diagram illustrating an aspect in which an image is displayed in a state where a display unit is inactivated in the mobile terminal according to the present invention.

FIG. 2 illustrates an aspect in which specific information 201 is displayed in the form of an image in a state where the display unit 151 is inactivated.

The specific information 201 can be displayed at the same time as the screen of the display unit 151 is turned off. Alternatively, the specific information 201 may be realized in such a manner that it appears after time predetermined (for example, 0.2 to 0.3 seconds) elapses after the screen (for example, a home screen) of the display unit 151 is turned off.

In addition, in addition to the time information that is illustrated in FIG. 2, the specific information can include event information that is received, such as a message or call that is received. In addition, in FIG. 2, the specific information, for example, is displayed only on a one upper portion of the display unit 151, but this is only for illustration. A position or size of the portion can be changed variously. For example, the entire display unit 151 can, of course, be used for displaying the specific information on the display unit 151 in the inactivated state.

In addition, the specific information can be displayed to a brightness level that is at or below a reference value, in order to minimize consumption of the power of a battery of the mobile terminal 100. In this case, the controller 180 may automatically adjust the brightness for output of the specific information displayed, according to a proximity touch (including touch) to the display unit 151 or according to a value of illuminance in the vicinity of the mobile terminal 100 or the like.

Image data is temporarily stored in a memory 170 of the mobile terminal 100 according to the embodiment of the present invention, which is described above. The memory 170 is a memory for storing image data associated with an image that is output to the display unit 151. Examples of the memory 170 include a graphic RAM (a GRAM).

Particularly, multiple memory areas are formed as a result of partitioning the graphic memory of the mobile terminal 100. At this time, different pieces of image data are stored in the graphic memory areas, respectively, and the controller 180 can independently control electric current that is supplied to each of the areas. For example, while a first graphic memory area is activated to be supplied with electric current, a second graphic memory area remains in the inactivated state and thus can reduce electric current consumption. This is because it is apparent that when image data which is stored in the graphic memory is read, electric current consumption increases, but that when image data which is stored in one portion thereof is read, electric current consumption decreases. Therefore, in a case where one or several pieces of image data, among different types of pieces of image data that are stored in the graphic memory, are output, the controller 180 selectively drives one or several areas, among multiple graphic memory areas.

In addition, in the inactivated state in which the AOD function described above is applied to the display unit 151, the controller 180 can select one or several portions of or all portions of the multiple graphic memory areas, based on the size of an image that is to be output to the display unit 151. Then, an image that corresponds to an image data which is stored the selected graphic memory area is displayed on an area designated of the display unit 151 using multiple pixels.

In this case, a power source unit 190 that is formed in such a manner as to supply a power individually to each of the multiple graphic areas operates to apply powers only to one or several graphic areas that are selected by the controller 180, and to block the supplying of powers to the other graphic areas.

Figure 3A:
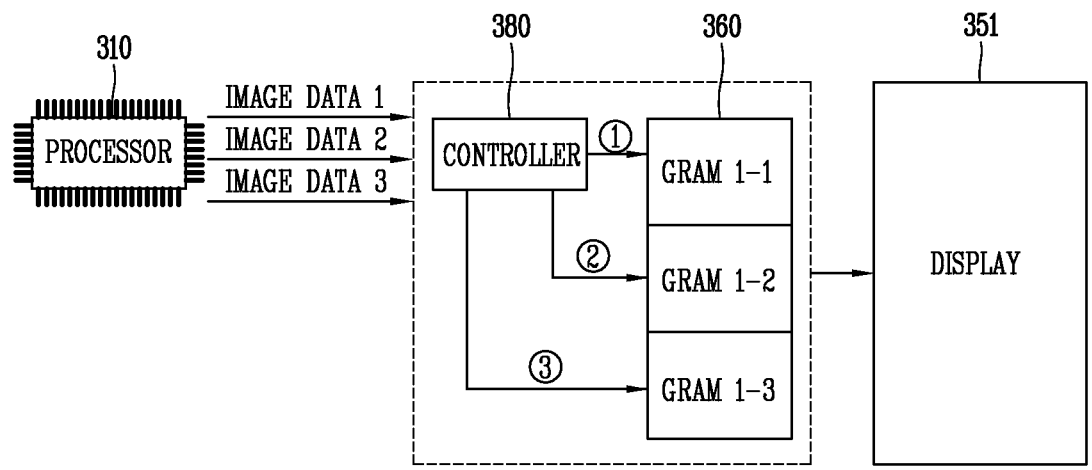
FIGS. 3A and 3B are block diagrams, each illustrating a drive circuit of the display unit of the mobile terminal according to the present invention.
Figure 3B:
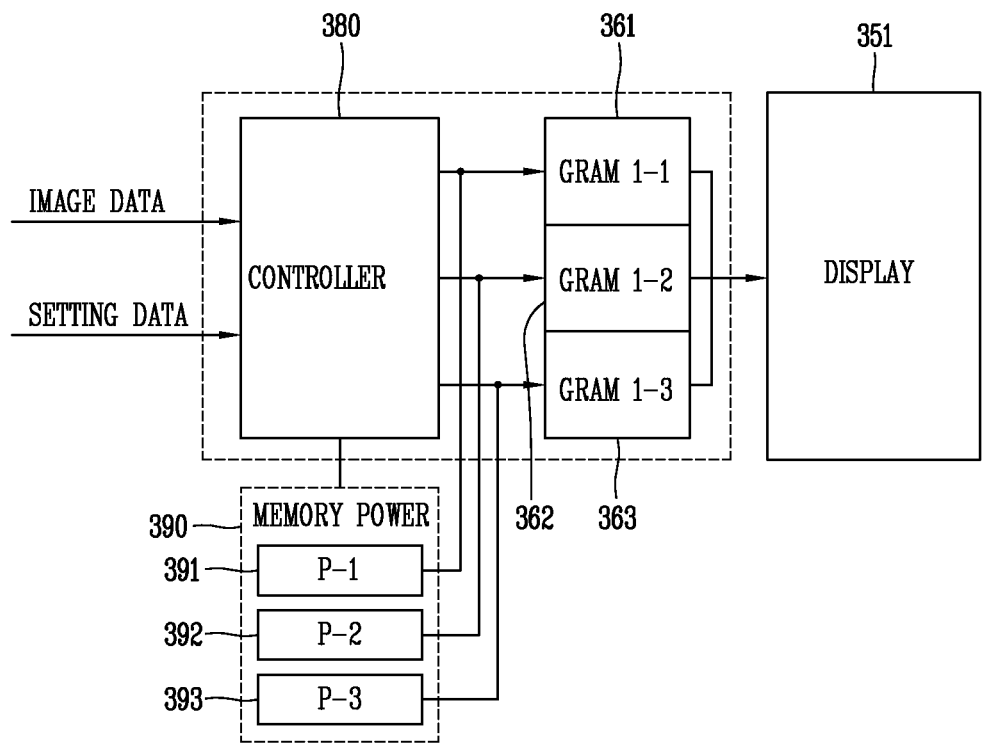

FIGS. 3A and 3B are block diagrams, each illustrating a drive circuit of the display unit of the mobile terminal according to the present invention, which will be described.

As illustrated in FIG. 3A, the drive circuit can be configured to include a processor 310, a controller 380, a graphic memory 360 that are partitioned into multiple graphic memory areas, and a display unit 351 to which an image that corresponds image data which is provided from each of the multiple graphic memory areas is output.

The processor 310, for example, can mean an application processor (AP). In addition, the display unit 351 can mean a display panel. Therefore, the displaying of the image corresponding to the image data on the display unit 151 or 351 in the present specification can mean output of the image data to the display panel. When the processor 310 transfers multiple pieces of image data (image data 1, image data 2, and image data 3) one time to the graphic memory 360, only pieces of image data that are stored in one or more graphic areas that are driven, in the graphic memory 360, are thereafter refreshed at predetermined intervals.

The drive circuit operates to store pieces of image data that are received from the processor 310, in different areas of the graphic memory, respectively. Then, the drive circuit operates to drive one or several graphic memory areas that are selected, according to a control command of the controller 180 and thus read partial image data that is stored, and to output the read partial image data to the display unit 151 while refreshing the read partial image data on a Hz basis.

The graphic memory 360, as illustrated in FIG. 3A, may be divided into three areas (1-1, 1-2, and 1-3), and can be partitioned into many more areas or smaller areas. However, as the number of graphic memory areas that result from the partitioning increases, the numbers of drive circuits, control IPs, and the like, which are positioned in a bezel that of the mobile terminal 100, increases proportionally. Thus, the size of the entire terminal increases. In addition, it is also possible that multiple graphic areas result from the partitioning in the longitudinal direction differently than those which are illustrated in FIG. 3A.

In addition, address data associated with a position for output to the display unit 151, which is provided together from the processor 310, can be included in each piece of image data that is stored in each of the graphic memory areas of the graphic memory 360. At this time, the address data does not correspond to an address of the graphic memory area in which image data is stored, on a one-to-one basis. That is, there is no need to match a position on the display unit 151, to which image data is spread, to an actual position of the activated graphic memory area, and thus the image data can be output to any position on the display unit 151. In addition, the address data includes only start coordinates and does not include an output range, in such a manner that the start coordinates can be changed and thus an output position can be changed on the display unit 151.

In addition, the graphic memory 360 can include a memory space that corresponds to a resolution of the display unit 151 and/or the number of color gradations.

In addition, the controller 180 may read only one or several pieces of image data, not all pieces of image data, which are stored even in the selected one or several graphic memory areas. In this case, the image data that is refreshed at predetermined intervals can also be limited to one or several pieces of image data.

In addition, in FIG. 3A, the controller 380 drives multiple graphic memory areas in designated order (1, 2, 3) and thus can perform control in such a manner that images which vary are sequentially displayed on a specific area of the display unit 151, or sequentially appear or disappear on different areas of the display unit 151. Even in this case, while any one of the graphic memory areas is driven, powers that are applied to the other graphic memory areas are blocked or the reading from the other graphic memory areas is limited. Thus, the electric current consumption can be minimized.

Next, with reference to the drive circuit that is illustrated in FIG. 3B, the controller 380 further receives setting data in addition to the image data, and based on this, can selectively drive multiple graphic memory areas 361, 362, and 363. In addition, memory power sources 391, 392, and 393 can be connected to the multiple memory areas 361, 362, and 363, respectively. A memory power source unit 390 selectively switches on and off the memory power source that corresponds to the selected graphic memory area, according to the control command of the controller 380.

Figure 4:
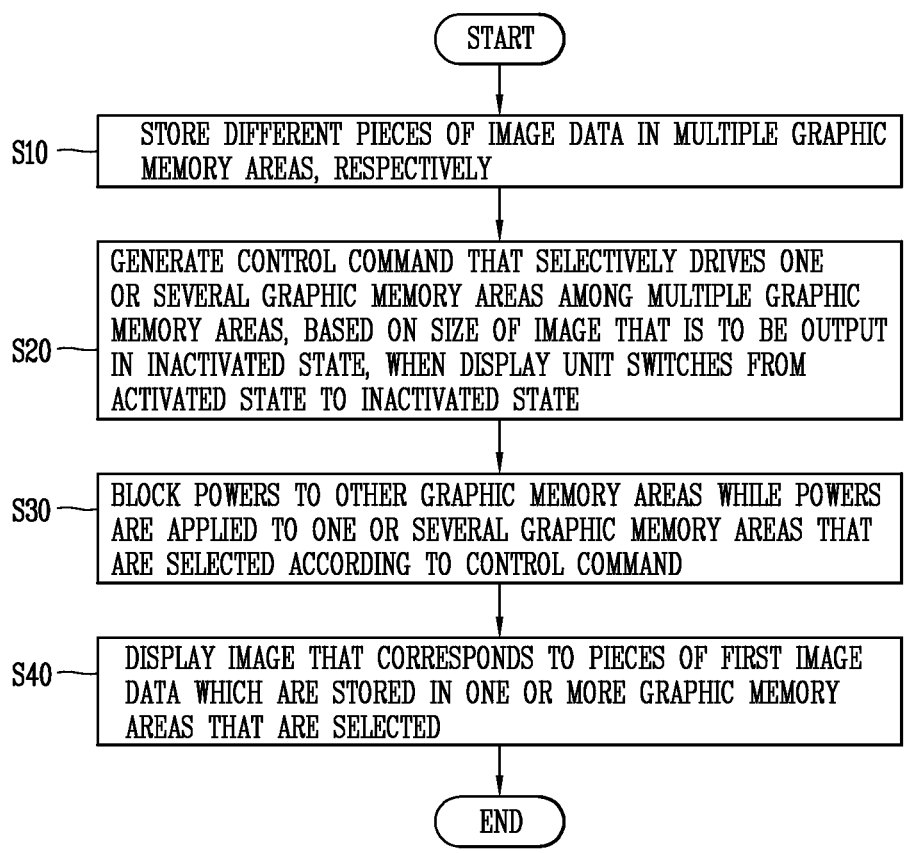
FIG. 4 is a representative flowchart for describing an operation that is realized in the mobile terminal according to the present invention.
Figure 5A:
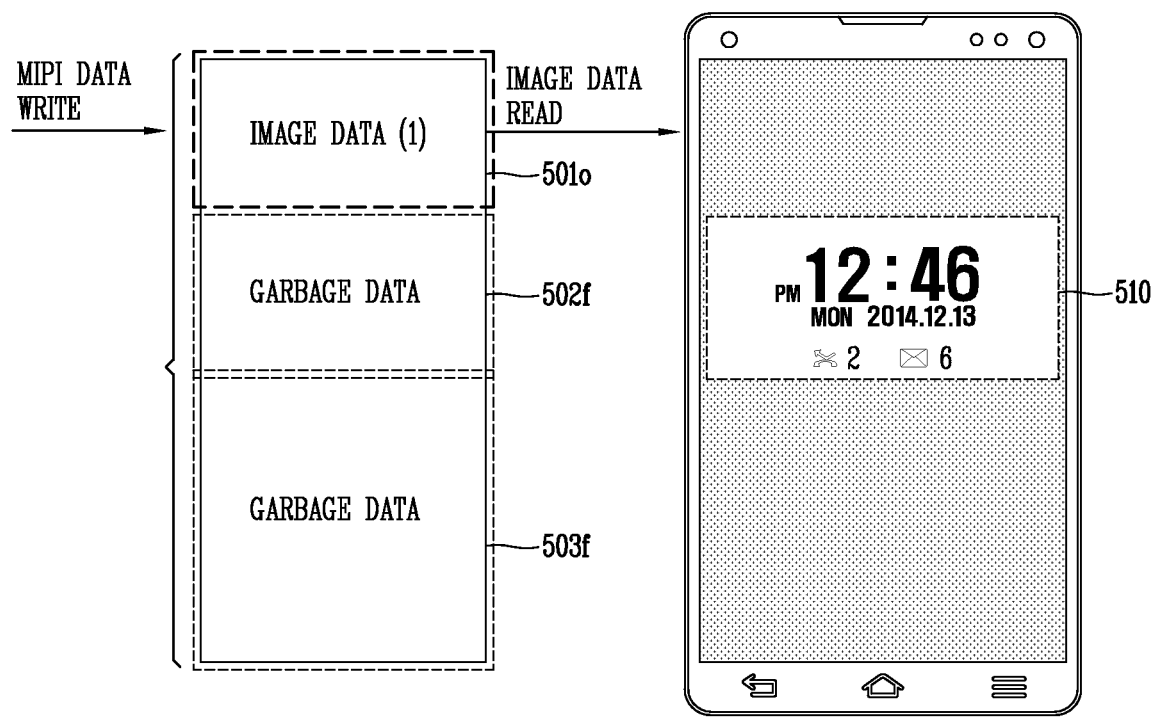
FIGS. 5A, 5B, 5C, 6A, 6B, 6C, 7A, 7B, and 8 are conceptual diagrams, each illustrating an example in which battery-electric current consumption is minimized in the case where the image is displayed in the state where the display unit is inactivated in the mobile terminal according to the present invention.
Figure 5B:
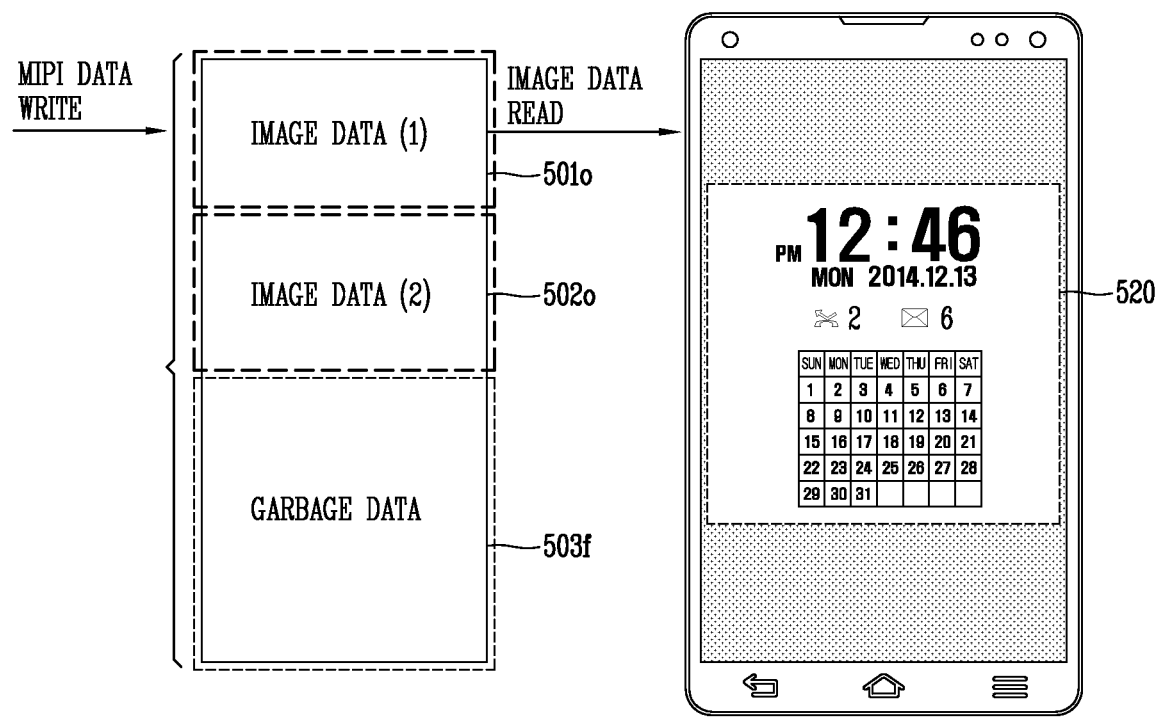
Figure 5C:
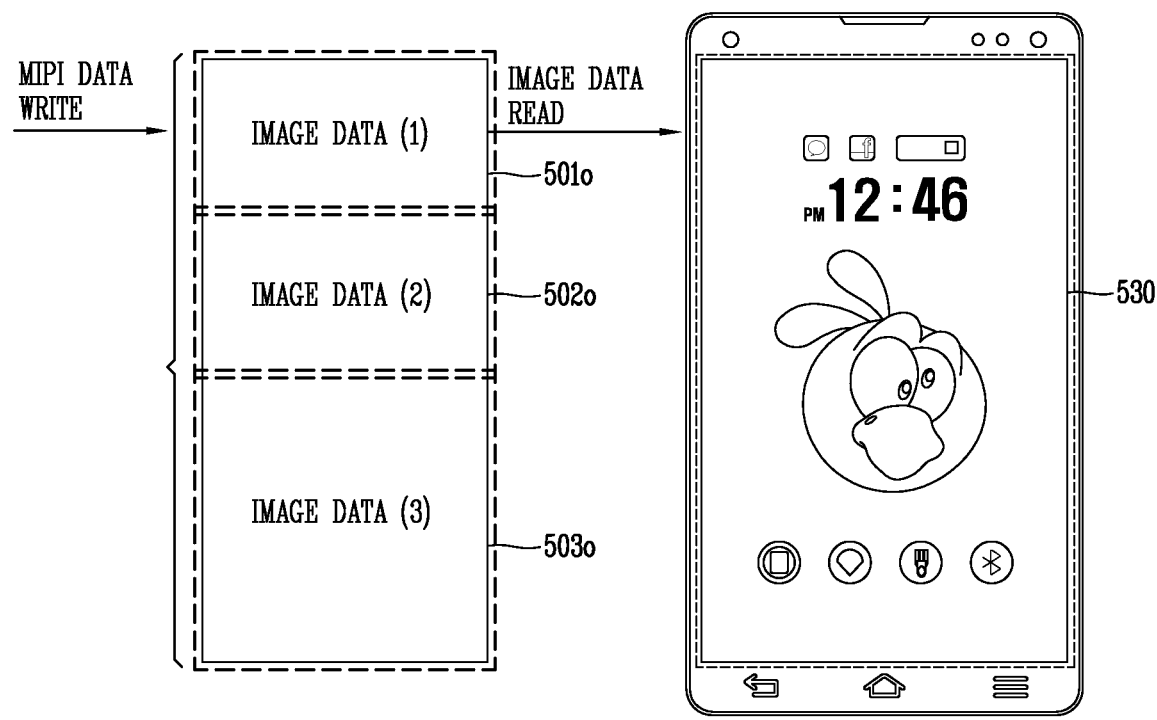

FIG. 4 is a representative flowchart for describing an operation that is realized in the mobile terminal according to the present invention, which will be described below. FIGS. 5A TO 5C are diagrams, each illustrating an aspect in which one or several graphic memory areas, among multiple graphic memory areas, are selectively driven according to the embodiment of the present invention, which will be described below.

First, when the display unit 151 of the mobile terminal 100 switches from the activated state to the inactivated state, the AOD function for displaying designated information on the display unit 151 is performed. When the AOD function is performed, the information designated is output to a specific area of the display unit in the low-power mode. An operation according to the present invention will be described below on the assumption that the AOD function is performed in the state where the display unit 151 is inactivated.

With reference to FIG. 4, in order to display an image on the display unit 151, different pieces of image data are first stored in multiple graphic memory areas that result from partitioning one graphic memory area, respectively (S10).

Next, when the display unit 151 of the mobile terminal 100 switches from the activated state to the inactivated state, the AOD function is performed. Based on the size of an image that is to be output in the inactivated state, a control command for selectively driving one or several graphic memory areas, among multiple graphic memory areas, is generated (S20). The control command corresponds to the command for controlling the operation of the drive circuit that is illustrated in FIGS. 3A and/or 3B.

While powers are applied to the selected one or several graphic memory areas, powers to the other graphic memory areas that are not selected are blocked (S30). For example, in a case where the first graphic memory area is selected from among the first and second graphic memory areas and a third graphic memory area, only a memory power source that is connected to the first graphic memory area is in an ON state, power sources to the second and third graphic memory areas remains in an ON state.

Next, an image that corresponds to first image data that is stored in the selected one or several graphic memory area is displayed on the display unit 151 (S40). In addition, the graphic memory area on which the refreshing and the reading are performed at predetermined intervals are also continuously limited to the first graphic memory area.

In one embodiment, in FIG. 5A, only a single graphic memory area is activated among multiple graphic memory areas in a first AOD operation mode to display an image. When image data is recorded in a mobile industry processor interface (MIPI), the received image data is stored in one or several graphic memory areas among multiple graphic memory areas according to a type of data, the number of frames, and the like. The first graphic memory area is activated (501o), and the second and third graphic memory areas are inactivated (502f and 503f).

For example, when the first AOD operation mode is entered, in a case where a first image 510 that includes time, a date, and the event information is output in a minimum-sized manner (in a compactly-sized manner) to the display unit 151, a purpose to minimize the electric current consumption can be achieved by activating only the first graphic memory area. In this case, a voltage of 1.8 V is applied only to the first memory power source that is matched to the first graphic memory area. Accordingly, only an electric current of approximately 50.68 mW is consumed. In addition, a first image data that is stored in the first graphic memory area is refreshed at an interval of approximately 30 Hz.

On the other hand, even while only the same graphic memory area is driven continuously, any output position on the display unit 151 can be changed. That is, when the first image data is refreshed, the changing of the output position can be achieved by changing address data (for example, start coordinates) associated with the output position on the display unit 151, which is included in the first image data.

In another embodiment, in FIG. 5B, two graphic memory areas are activated among multiple graphic memory areas in a second AOD operation mode to display an image. At this point, the first and second graphic memory areas are activated (501o and 502o), and the third graphic memory area is inactivated (503f). For example, when the second AOD operation mode is entered, in a case where, in addition to the first image including time, a date, and the event information, a second image including schedule calendar information is displayed in a middle-sized manner on the display unit 151, the purpose to minimize the electric current consumption can be achieved by activating only the first and second graphic memory areas. At this point, the first and second images can be output in such a manner as to be brought into contact with each other or separated from each other. In FIG. 5B, the first image and the second image are brought into contact with each other and thus one integrated image 520 is provided.

In addition, in the second AOD operation mode, a voltage of approximately 1.8 V is applied to the first memory power source that is matched to the first graphic memory area and the second memory power source that is matched to the second graphic memory area. Accordingly, only an electric current of approximately 58.98 mW that is larger in electric current consumption than in the case of the first AOD operation mode is consumed. In addition, only the first image data and the second image data that are stored in the first and second graphic memory areas, respectively, are refreshed at an interval of approximately 30 Hz.

In another embodiment, in FIG. 5C, multiple graphic memory areas are all activated in a third AOD operation mode to display an image. At this time, at this point, the first, second, and third graphic memory areas are all activated (501o, 502o, and 503o). That is, this corresponds to a case where an image is output in a full-screen-sized manner to the display unit 151, and at this time, the same electric current consumption as in the related art takes place. However, when the switching to the second or first AOD operation mode takes place according to designated order or setting, the electric current consumption is again minimized.

In this manner, regardless of the size of an image that is to be displayed, the reading of pieces of image data that are stored in one entire graphic memory causes an electric current consumption of 70 mV or more in the related art, but according to the present invention, the AOD function can be performed with a more minimized electric current consumption except for the case where an image (530) is output in a full-screen-sized manner, which is a further step from the low-power mode.

On the other hand, address data associated with the output position on the display unit 151 can be included in the first image data that is stored in the selected graphic memory area.

In addition, in one embodiment, a position of a memory area that corresponds to the first image data which is to be output and an output position on the display unit 151, which corresponds to the first image data, can have different pieces of address data. Furthermore, the output position on the display unit 151, which corresponds to the first image data, may not be fixed and be changed in the designated order each time the refreshing takes place. Therefore, the first image data that is stored in the selected graphic memory area is limited only to the size of the image that is to be output, and any output position can be chosen.

In addition, by changing the number of graphic memory areas that are selected, the controller 180 can perform control in such a manner that a varying image is output to the display unit 151. At this time, the varying image can refer to an image that results from outputting the first image data corresponding to the first graphic memory area and the second image data corresponding to the second graphic memory area sequentially or at the same time.

In FIGS. 6A, 6B, and 6C and FIGS. 7A and 7B, multiple graphic memory areas can be referred to as multiple frame buffer areas, respectively. Accordingly, the first, second, and third graphic memory areas can be referred to as first, second, and third frame buffer areas, respectively.

In this case, the size of an output image corresponding to one frame buffer area, that is, the first frame buffer area, can be fixed in such a manner that up to 800 lines in the longitudinal direction are possibly used. Furthermore, the size of the output image in a case where the first and second frame buffer areas are used can be fixed in such a manner that up to 1600 lines in the longitudinal direction are possibly used. Furthermore, the size of the output image in a case where all frame buffer areas are used can be fixed in such a manner that up to 2880 lines in the longitudinal direction are possibly used.

The frame buffer area that is selected by the controller 180 varies according to a type of image that is to be output to the display unit 151 and information that is set for the mobile terminal 100. For example, in a case where the type of image, for example, is a moving image such as an image in the GIF, at least two frame buffer areas can be selected and driven. The frame buffer area and the graphic memory area will be interchangeably used below.

Figure 6A:
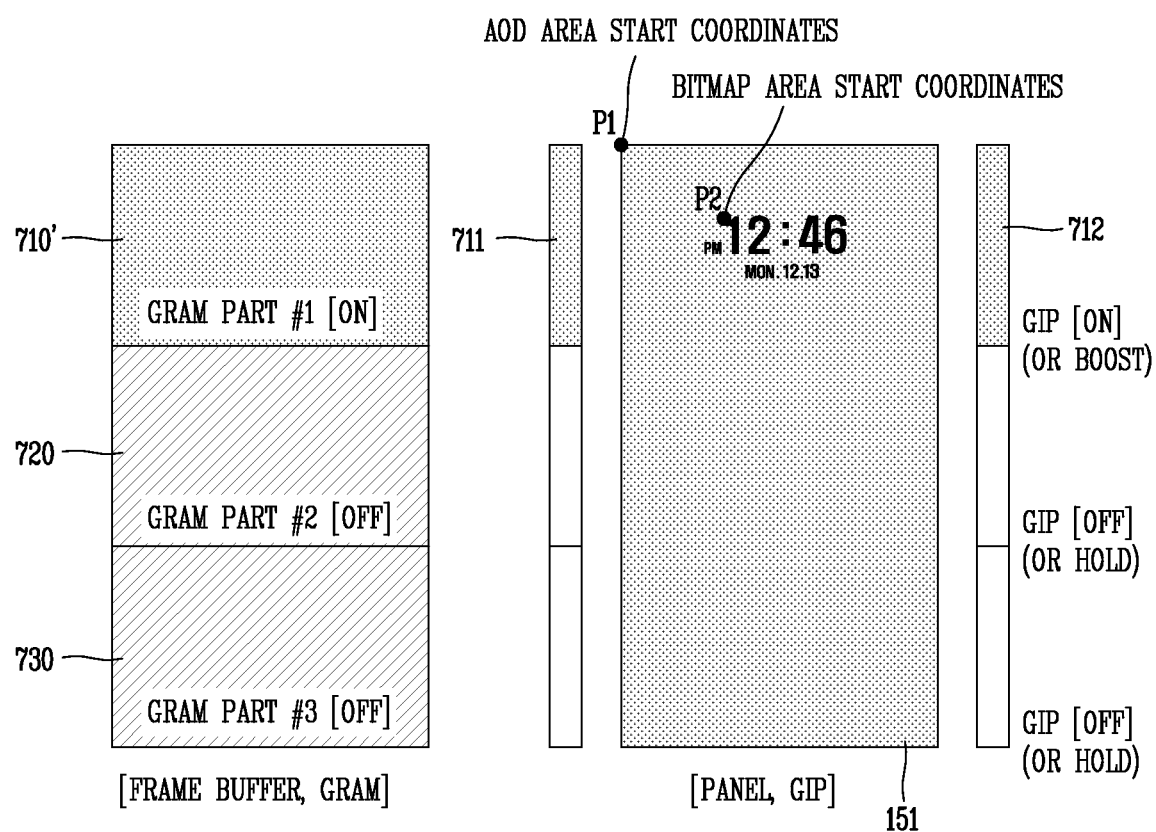

With reference to FIG. 6A, only the first graphic memory area is in the ON state (710') and the other graphic memory areas are in the OFF state (720 and 730). First start coordinates P1 representing the output position on the display unit 151 and second start coordinates P2 in a bitmap area, which corresponds to the first image data, in a state where the AOD function of the display unit 151 is performed, are included in the first image data that is stored in the first graphic memory area.

The first and second start coordinates do not need to be matched to each other, but the second start coordinates are positioned within a range where the output to the display unit 151 is possible, which corresponds to at least the first start coordinates. That is, a line in the second start coordinates cannot be positioned in a line before (or above) the first start coordinates.

Figure 6B:
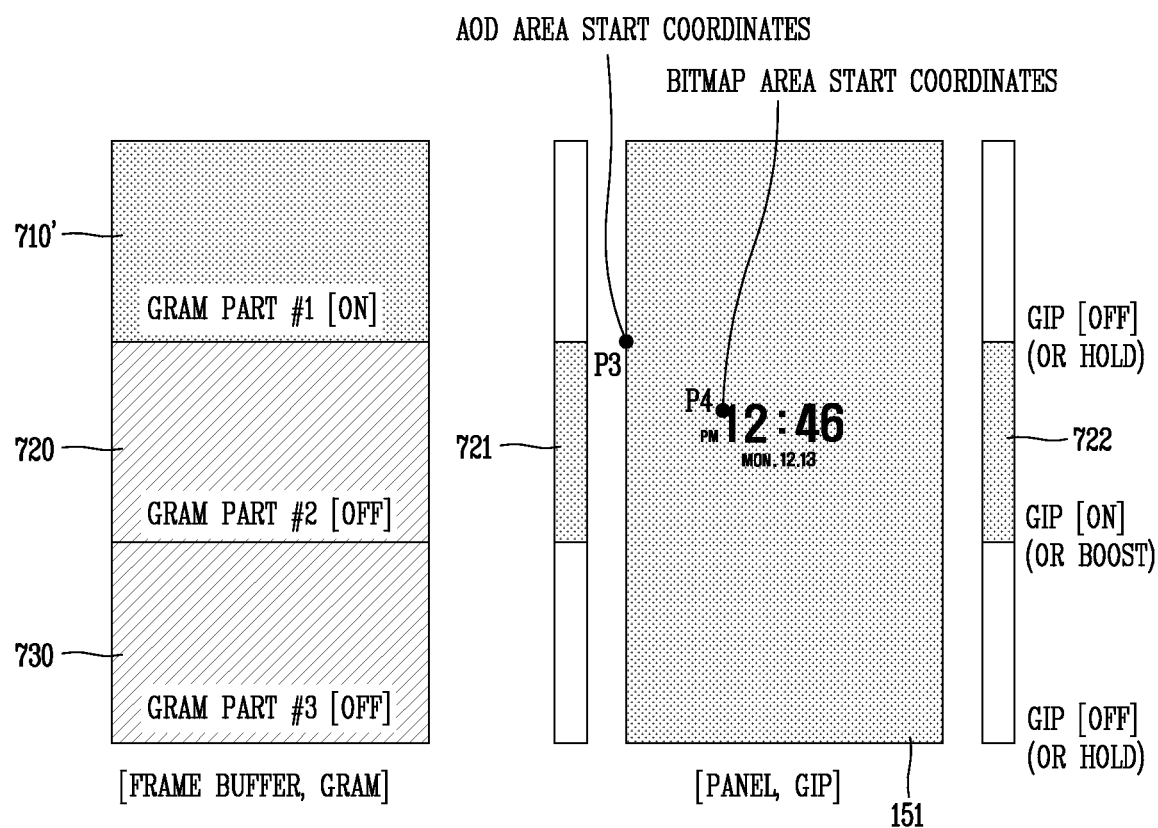

On the other hand, with reference to FIG. 6B, it can be seen that the output area on the display unit 151 does not need to be matched to the actual position of the selected graphic memory area. In a case where, like in FIG. 6A, only the first graphic memory area is in the ON state (710'), third start coordinates P3 representing a position to which the first image data that is stored in the first graphic memory area is output and fourth start coordinates P4 in the bitmap area, which corresponds to the first image data, in the state where the AOD function of the display unit 151 is performed, are different from the first start coordinates P1 and the second start coordinates P2 in FIG. 6A, respectively. That is, upper areas 711 and 712 of the display panel is in the ON state in FIG. 6A, but it can be seen in FIG. 6B that middle areas 721 and 722 are in the ON state.

Figure 6C:
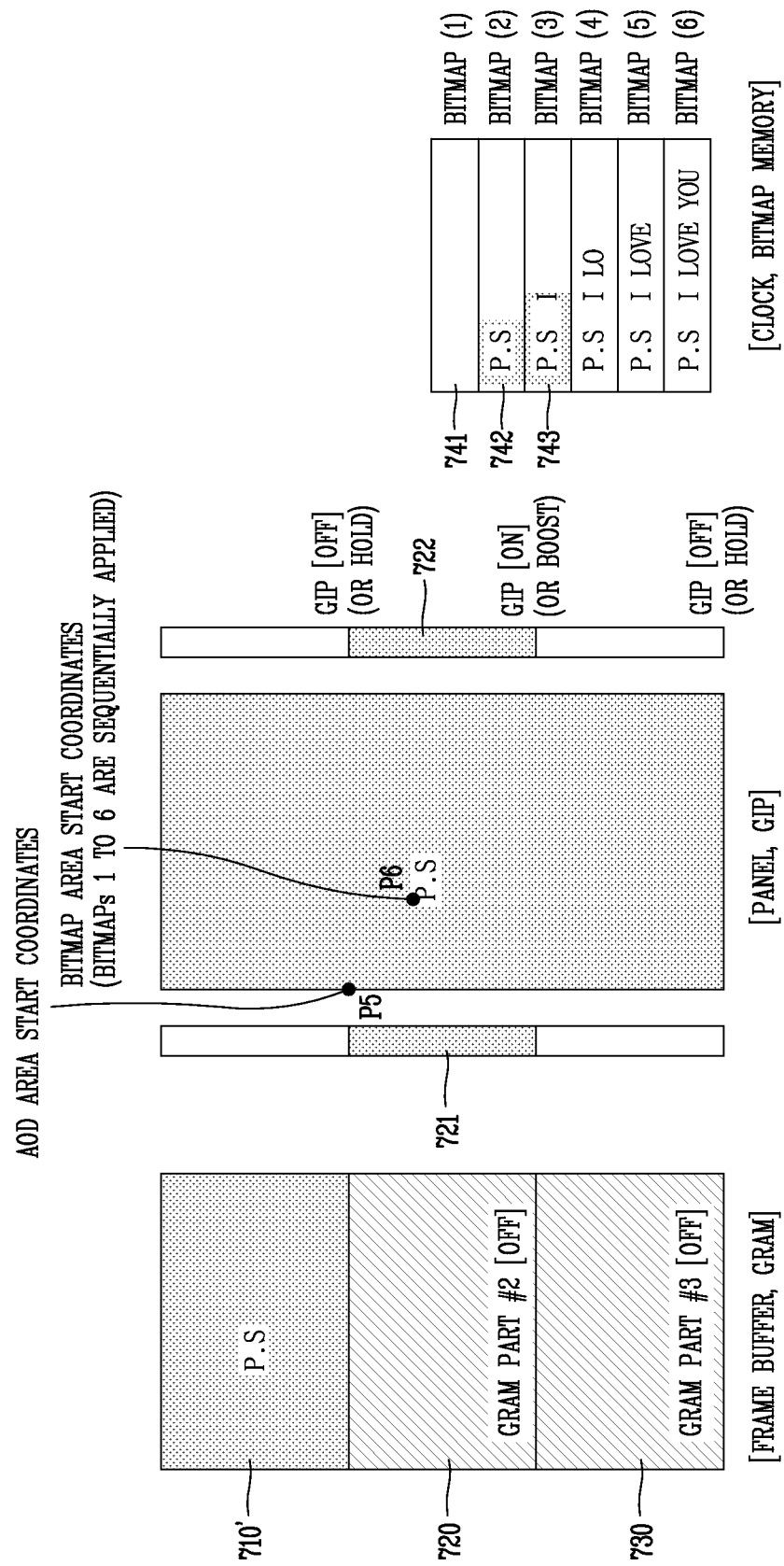

FIG. 6C illustrates an example in which a moving image is output in real time using the selected signal graphic memory area. When the image data that is stored in the first graphic memory area 710' is refreshed, in a case where the moving image is formed, the middle areas 721 and 722 of the display panel first switches to the ON state. Then, images 741, 742, 743, and so forth that are stored in corresponding multiple bitmap memory areas, respectively, are sequentially applied to start coordinates P6 in the bitmap area, and thus a moving emotional image, for example, an emotional image in which text is recorded in real time can be output.

Figure 7A:
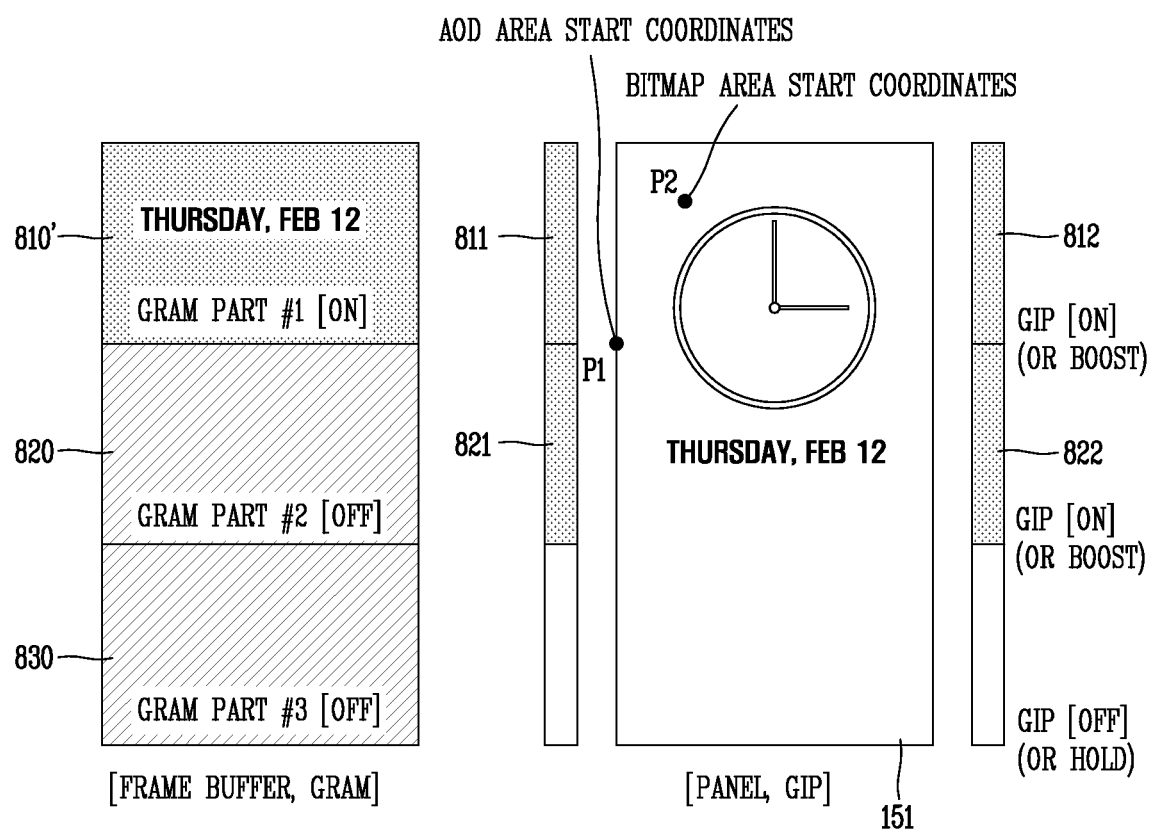
Figure 7B:
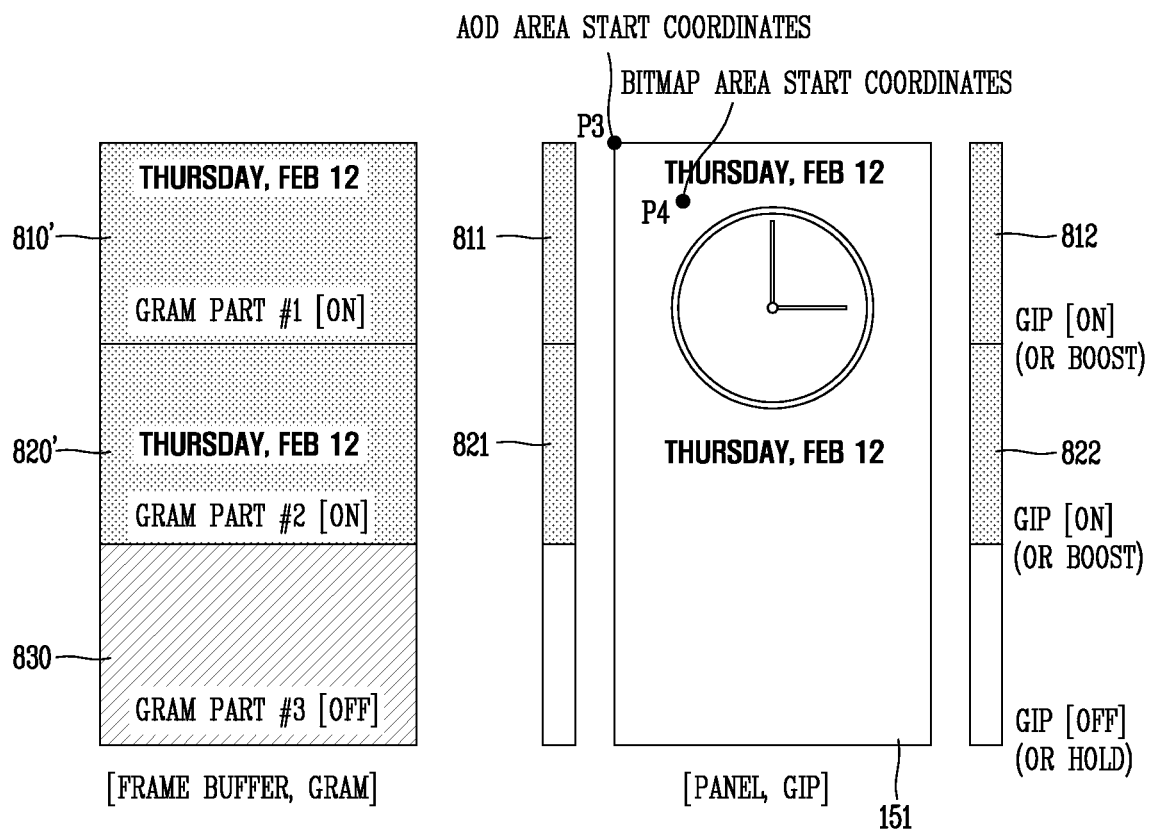

In addition, in other embodiments, FIGS. 7A and 7B each illustrate an example in which an analog watch image is output with a minimum electric current consumption to the display unit 151 on which the AOD function is performed. The analog watch image is larger in image size than a digital watch image.

First, FIG. 7A illustrates an example in which only one single graphic memory area is activated (810'), multiple display panels switch to the ON states 811, 812, 821, and 822, respectively, and thus the analog watch is output. In this case, the start coordinates P1 on the display unit 151 to which the AOD function is exceptionally applied can be positioned in a line behind (or a line below) the start coordinates P2 in the bitmap, which corresponds to an image that is to be output.

In a bitmap memory, the analog watch image can be supported to be displayed, and in the activated graphic memory area 810', image data that corresponds to date information can be supported to be displayed below the analog watch image (in a range where the output of an image is possible with the start coordinates P1 on the display unit 151 serving as a reference).

FIG. 7B illustrates another example in which two graphic memory areas are activated (810' and 820'), multiple display panels switch to in the ON states 811, 812, 821, and 822), respectively, and thus the analog watch is output. In this case, the start coordinates P3 on the display unit 151 to which the AOD function is applied is changed and bitmap start coordinates are fixed in the same manner. In addition, the first graphic memory area and the second graphic memory area each can support the image data that corresponds to the date information above or below the analog watch image.

Figure 8:
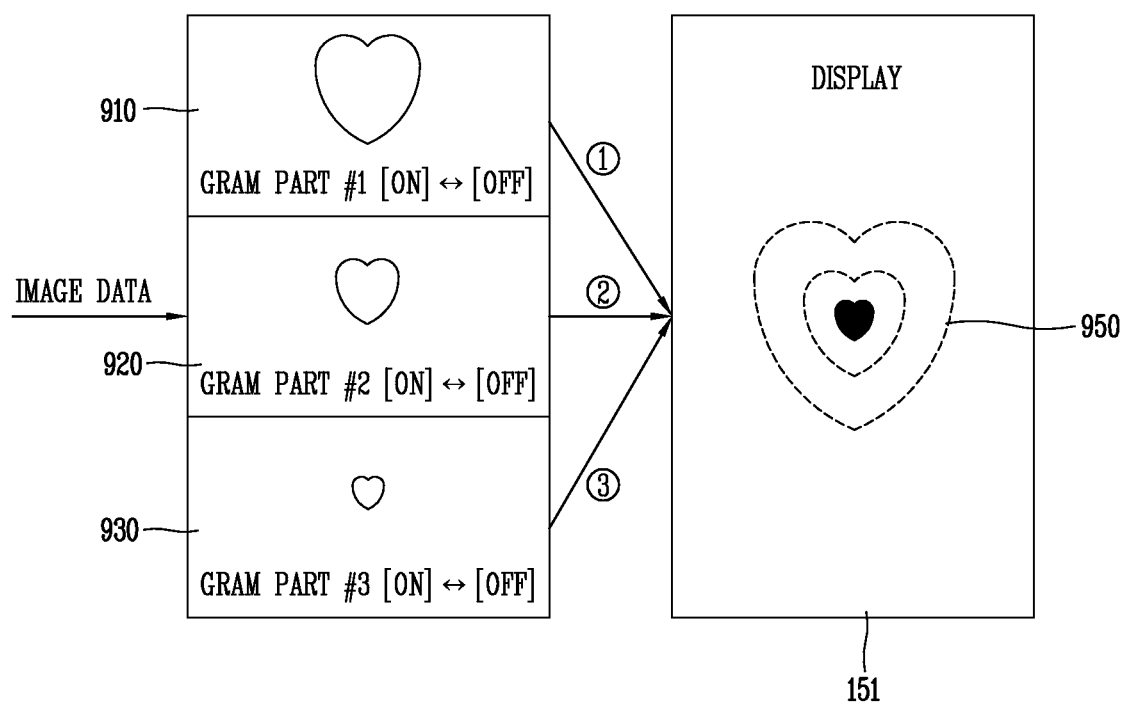

FIG. 8 illustrates an example in which in the mobile terminal according to the present invention, in a state where the display unit is inactivated, the moving image is displayed while the battery electric current consumption is minimized, which will be described below.

In the drive circuit that is described above with reference to FIG. 3A or 3B, the AP can provide images that are associated with multiple graphic memory areas, respectively. In this case, each of the pieces of image data that are stored in the multiple graphic memory areas, respectively, can correspond to partial data that constitutes a first moving image.

Accordingly, by selectively driving different pieces of image data, which are stored in multiple graphic memory areas, respectively, according to the designated order, the controller 180 can perform control in such a manner that the moving image that is moved is output to the display unit 151.

For example, with reference to FIG. 8, different pieces of image data that correspond to heart images with different sizes, respectively, can be stored in multiple memory areas 910, 920, and 930, respectively. At this time, pieces of address data (for example, the start coordinates) that are included in the pieces of image data, respectively, that are stored can be matched to the heart images, respectively.

By alternately driving the first, second, and third graphic memory areas according to the designated order, the controller 180 can output the moving image (for example, an image that is moved as if a heart beats) 950 that is moved, to the display unit 151. To do this, bitmap memory areas of which the number corresponds to different pieces of image data can be retained in terms of realization. In addition, the controller 180 can change the number of frames that correspond to still images, respectively, which constitute the moving image.

In addition, although not illustrated, in a case where a first moving image and a second moving image are output sequentially and randomly, it is possible, in terms of realization, that the first, second, and third graphic memory areas are alternately driven and then that partial image data which corresponds to the second moving image is read when the first graphic memory area is again driven. That is, at a first time, pieces of partial image data that correspond to the first moving image can be provided to the first, second, and third graphic memory areas, respectively, and at a second time thereafter, pieces of partial image data that correspond to the second moving image can be provided to the first, second, and third graphic memory areas, respectively. In addition, at this time, by setting start coordinates of the pieces of partial data that correspond to the first and second moving images differently from each other, an output position of the first moving image and an output position of the second moving image can be set differently from each other.

In addition, in one embodiment, while the AOD function is performed, in a case where an event occurs in a specific application (for example, in a case where a message arrives), the controller 180 checks whether or not an available space is present in a memory area that corresponds to the current first image data. Then, based on a result of the checking, the controller 180 can provide information associated with the event using the same memory area. That is, in a case where a bitmap memory space to which the information associated with the event is present, the previous information and the event information can be provided together without the need to additionally drive other graphic memory areas.

On the other hand, in one embodiment, the mobile terminal 100 can further include a processor that, in the activated state of the display unit 151, generates at least one or several pieces of image data among multiple pieces of image data and provides the at least one or several pieces of image data, which are generated, to a graphic memory area that is matched, among multiple graphic memory areas, and that in the inactivated state, operates in a sleep mode. Accordingly, thereafter, image refreshing is performed without the processor being involved. As other embodiments according to the present invention, various embodiments associated with a method of avoiding a residual image will be described below. The lifetime of the display panel (specifically, an OLED) can be shortened due to two types of situations, an abrupt reduction in luminance, which results from formation of a darkness point, and a reduction in luminance over time, which results from degradation of an element itself.

A reduction in lifetime due to the performing of the AOD function corresponds to the latter. Normally, the reduction in luminance due to the degradation of the element itself takes place uniformly over all pixel areas without any change in external appearance, but when only a specific area is continuously used, a degradation of an OLED element in the specific area develops faster than those in other areas. Thus, a non-restored residual image occurs.

FIGS. 9, 10, 11, and 12 are conceptual diagrams, each illustrating an example associated with a method in which a residual image is avoided while the minimization of the electric current consumption described above is maintained when the AOD function is applied in the mobile terminal according to the present invention, which will be described below.

An image that corresponds to image data that is provided in a graphic memory area is output using multiple pixels of the display unit 151. According to the present invention, a speed of the degradation of the pixel can be decreased to a minimum by performing masking processing on one or several pixels among the multiple pixels in order to avoid the residual image.

Figure 9:
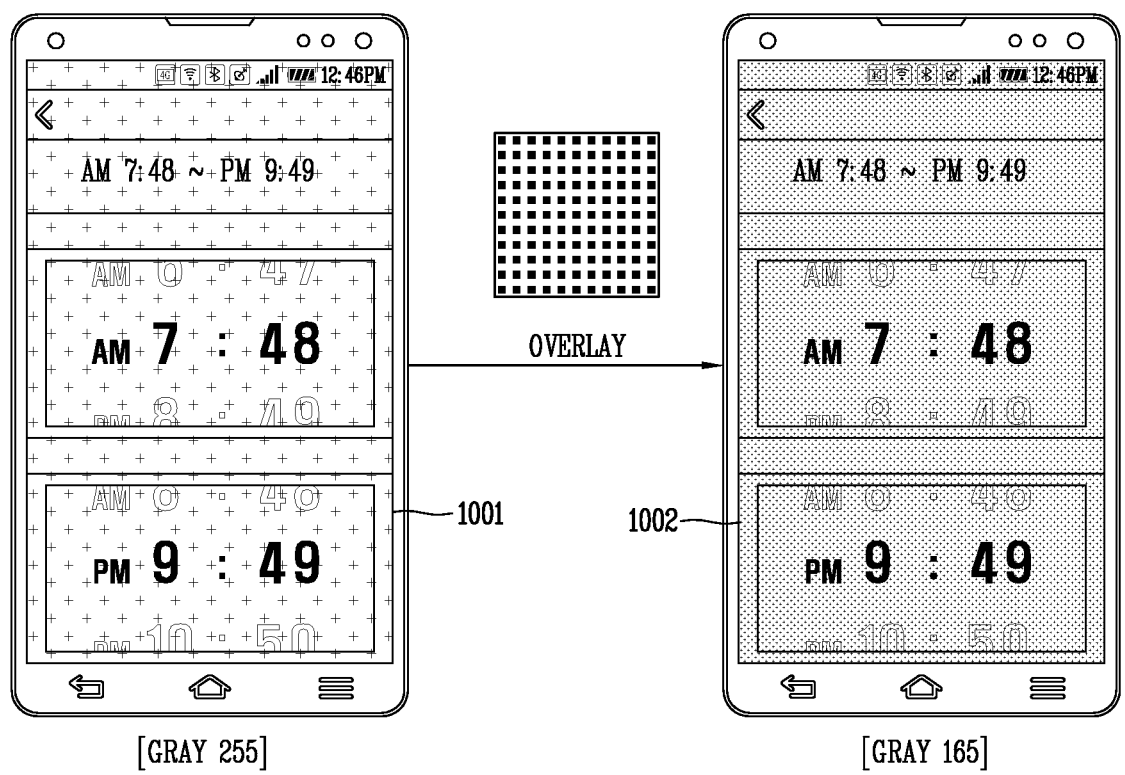
FIGS. 9, 10, 11, and 12 are conceptual diagrams, each illustrating an example associated with a method in which a residual image is avoided in the case where the image is displayed in the state where the display unit is inactivated in the mobile terminal according to the present invention.

To do this, the controller 180 can detect a residual image area, and based on the detected residual image area, also changes a masking patterns with a periodicity of update of the image that corresponds to the first image data. An example in which this masking pattern is overlaid is illustrated in FIG. 9. The left-hand part of FIG. 9 is a pre-masking-processing screen 1001, and the right-hand part is a post-masking-processing screen 1002. It can be seen that screen brightness is reduced when performing the masking processing on one or several pixels. A solution to this problem will be described in more detail below.

FIG. 10 illustrates an example in which the problem of the residual image is solved by performing changing to a method of rotating the masking pattern at the same position for the detected residual image area. As illustrated, a position of the masking pattern is changed by one pixel within a range where the output position of the first image data is continuously maintained.

Figure 11:
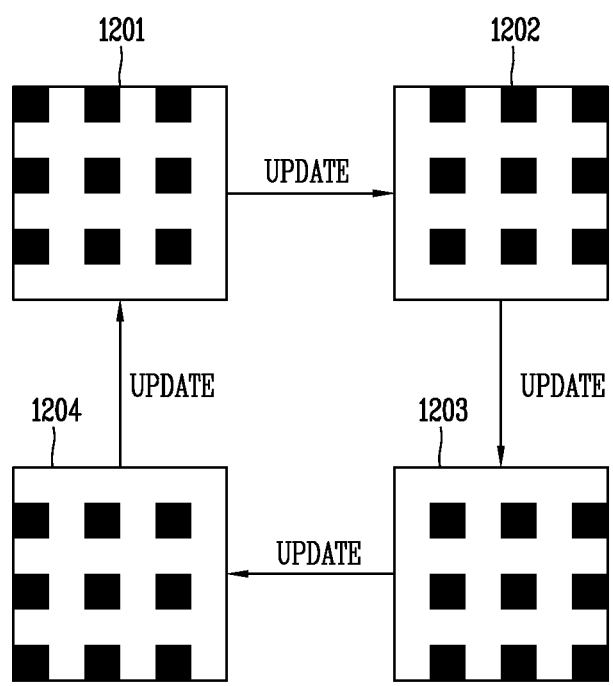

As specifically illustrated in FIG. 11, with one group consisting of basic four pixels, on a per-group basis, masking processing (for example, blackening processing) is performed on a pixel at a first position within each group (1201), and approximately one minute thereafter, that is, at a point in time for the update of the image data, the pixel on which the masking processing is to be performed is changed to a pixel at a second position within each group (1202). Then, approximately one minute thereafter, that is, at a point in time for the update of the image data, the pixel on which the masking processing is to be performed is changed to a pixel at a third position within each group (1203). Then, approximately one minute thereafter, that is, at a point in time for the update of the image data, the pixel on which the masking processing is to be performed is changed to a pixel at a fourth position within each group (1204). And then, approximately one minute thereafter, that is, at a point in time for the update of the image data, the pixel on which the masking processing is to be performed is returned to a pixel at the first position within each group (1201). That is, without the need to separately set a periodicity of a change of the masking pattern, the masking pattern may be changed together as well with a periodicity of the update of the graphic memory area. Accordingly, the masking pattern is sequentially changed for a pixel at a third position and a pixel at a fourth position within each group, and then returning to the pixel at the first position takes place. In this manner, this process is repeated on the four pixels themselves.

In this manner, in a case where a masking pattern position is changed on a small-sized basis, the output position of the image is not changed visually. Accordingly, the changing of the output position of the image in order to avoid the residual image also reduces a feeling of eye fatigue that is experienced by a user. However, exceptionally, in the case of the image in the residual image area, which is always used as described above in the activated state of the display unit 151, the masking pattern described above may be difficult to change due to a spatial restriction. Therefore, the residual image may be compensated for by performing the existing pixel movement at the same time.

On the other hand, in a case where the masking pattern is overlaid in order to avoid the residual image, the blackening processing is performed on one or several pixels. Because of this, the brightness of the entire image may be reduced.

To do this, in one embodiment, while the masking processing is performed on one or several pixels among multiple pixels, at least one of the transparency and the brightness of the image that is output can be automatically adjusted. At this point, different transparency or luminance can be applied to each of the multiple areas of the display unit 151 by applying different levels when the residual image area is detected.

In addition, in a case where an operation mode for the mobile terminal 100 varies according to conditions (for example, night or day, attending a movie at a theater, and weather) of a surrounding environment, different transparency or luminance can be applied. At this time, electric current consumption estimated for each luminance level that is to be applied is checked, and thus the brightness in a state where the AOD function is applied can be set differently.

Figure 12:
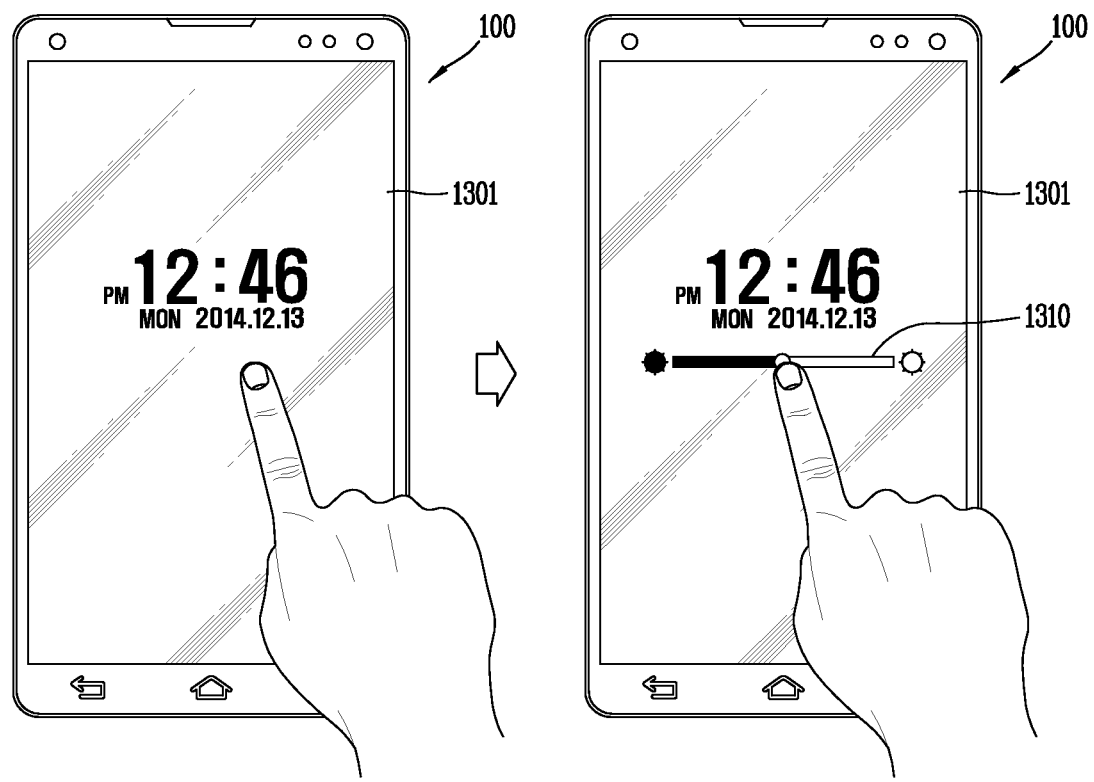

FIG. 12 illustrates an example in which at least one of the transparency and the brightness of the image is changed based on user input. As illustrated in FIG. 12, in the inactivated state where the AOD function is applied to the display unit 151, when a touch object, such as a user's finger, approaches for a predetermined time, an indicator 1310 in the form of a bar for adjusting the brightness of the image (the watch information) 1301 that is output can be output. Then, the brightness of the image that is output can be changed based on a drag touch input that is applied to the indicator. When a proximity touch is canceled without the drag touch input, the indicator 1310 again disappears from the screen.

Alternatively, although not illustrated, without outputting the indicator 1310, in a case where the proximity touch or a gaze is detected, the brightness of the image that is automatically output may be changed. Alternatively, it is possible that the outputting of the indicator 1310 is realized only in a case where the residual image area is detected.

As described above, in a case where one graphic memory area is partitioned into multiple areas and the designated information is output to the display unit on which the AOD function is performed, the mobile terminal according to the embodiment of the present invention provides and refreshes the image data using only one or several areas that are necessary, among the multiple areas, and thus can minimize the electric current consumption. In addition, in order to solve the problem that the residual image occurs in a case where the designated information is continuously output together, the pixel position for the masking pattern is changed on a per-small-sized-group basis, and thus the residual image can be compensated for while maintaining the output position of the image. In addition, in this case, by performs an automatic adjustment according to the surrounding environment or providing a suitable user interface (UI), the problem that the brightness of the image due to the overlay of the masking pattern is somewhat reduced.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a graphic memory that includes multiple graphic memory areas in which different pieces of image data are stored such that each piece of the image data is stored in a respectively corresponding one of the multiple graphic memory areas, wherein the graphic memory is configured to provide pieces of first image data that are stored in one or several graphic memory areas that are selected from among the multiple graphic memory areas according to a control command;
a display that is switchable between an activated state and an inactivated state and configured to display an image corresponding to the first image data using multiple pixels in the inactivated state;
a controller configured to:
  generate the control command for selectively driving the one or several graphic memory areas based on a size of the image that is to be displayed in the inactivated state; and
  cause the display to display the image corresponding to the first image data; and
a power source unit configured to apply power to the selected one or several graphic memory areas such that the first image data is read,
wherein the controller is further configured to maintain other non-selected memory areas in a power-off state while the first image data is read.

2. The mobile terminal of claim 1, wherein address data associated with an output position on the display is included in the first image data.

3. The mobile terminal of claim 2, wherein a position of a graphic memory area that corresponds to the first image data and the output position on the display, which corresponds to the first image data, have different pieces of address data.

4. The mobile terminal of claim 1, the controller is further configured to:
check whether an available space is present in a graphic memory area that corresponds to the first image data when an event occurs in at least one application in the inactivated state; and
provide information associated with the event using the same graphic memory area based on the available space.

5. The mobile terminal of claim 1, wherein:
the controller is further configured to cause the display to display a different image by changing a number of graphic memory areas that are selected; and
the different image results from outputting the first image data corresponding to a first graphic memory area and second image data corresponding to a second graphic memory area sequentially or concurrently.

6. The mobile terminal of claim 1, wherein the one or several graphic memory areas that are selected vary according to a type of the image that is to be displayed in the inactivated state.

7. The mobile terminal of claim 1, wherein:
pieces of image data that are stored in a respectively corresponding one of the multiple graphic memory areas correspond to pieces of partial data that constitute a first moving image; and
the controller is further configured to cause the display to display the first moving image by selectively driving different pieces of image data, which are stored in the respectively corresponding multiple graphic memory areas, according to a designated order.

8. The mobile terminal of claim 1, further comprising a processor configured to:
generate at least one or several pieces of image data among the different pieces of image data in the activated state;
provide the generated one or several pieces of image data to a matching graphic memory area among the multiple graphic memory areas in the activated state; and
operate in a sleep mode in the inactivated state.

9. The mobile terminal of claim 1, wherein the controller is further configured to:
perform masking processing on one or several pixels among the multiple pixels; and
detect a residual image area and change a pattern of masking periodically when the image corresponding to the first image data is updated.

10. The mobile terminal of claim 9, wherein a position of the pattern of the masking is changed within a range in which an output position of the first image data is continuously maintained.

11. The mobile terminal of claim 9, wherein at least one of transparency or brightness of the image that is input is automatically adjusted while the masking processing is performed on the one or several pixels among the multiple pixels.

12. The mobile terminal of claim 9, wherein the controller is further configured to:
cause the display to display an indicator for adjusting the brightness of the displayed image in response to a proximity touch being maintained for a predetermined time in the activated state; and
change the brightness of the displayed image based on a drag touch input applied to the indicator.

13. A method for controlling a mobile terminal comprising a graphic memory that includes multiple graphic memory areas, the method comprising:
storing different pieces of image data in the multiple graphic memory areas such that each piece of the image data is stored in a respectively corresponding one of the multiple graphic memory areas;
selectively driving one or several graphic memory areas among the multiple graphic memory areas based on a size of an image that is to be displayed in an activated state when a display of the mobile terminal is switched from the activated state to an inactivated state;
blocking power to graphic memory areas other than the one or several graphic memory areas among the multiple graphic memory areas such that power is applied to the one or several graphic memory areas selected from among the multiple graphic memory areas; and
displaying the image corresponding to pieces of the image data that are stored in the selected one or several graphic memory areas.

14. A mobile terminal comprising:
a graphic memory including multiple graphic memory areas and configured to store different pieces of image data in the multiple graphic memory areas such that each piece of the image data is stored in a respectively corresponding one of the multiple graphic memory areas;
a power source unit;
a display; and a controller configured to:
- selectively drive one or several graphic memory areas among the multiple graphic memory areas based on a size of an image that is to be displayed in an activated state when the display is switched from the activated state to an inactivated state;
- block power to graphic memory areas other than the one or several graphic memory areas among the multiple graphic memory areas, causing the power source unit to apply power to the one or several graphic memory areas selected from among the multiple graphic memory areas; and
- cause the display to display the image corresponding to pieces of the image data that are stored in the selected one or several graphic memory areas.

* * * * *